United States Patent [19]

Kalfs

[11] Patent Number: 4,481,385
[45] Date of Patent: Nov. 6, 1984

[54] ARRANGEMENT FOR CANCELLING ECHO SIGNALS

[75] Inventor: Johannes J. W. Kalfs, Eindhoven, Netherlands

[73] Assignee: U.S. Philips Corporation, New York, N.Y.

[21] Appl. No.: 374,122

[22] Filed: May 3, 1982

[30] Foreign Application Priority Data

May 7, 1981 [NL] Netherlands ........................ 8102225

[51] Int. Cl.³ ............................................. H04B 3/20
[52] U.S. Cl. ................................. 179/170.2; 179/170.6
[58] Field of Search ............... 179/170.2, 170.6, 170.8; 364/723; 370/28, 32, 103; 375/58, 99, 102, 103, 104

[56] References Cited

U.S. PATENT DOCUMENTS 4,334,128  6/1982  Snijders ........................... 179/170.2
4,362,909 12/1982  Snijders et al. ................. 179/170.2
4,411,006 10/1983  Horna ............................... 179/170.6

FOREIGN PATENT DOCUMENTS 48979  4/1982  European Pat. Off. ......... 179/170.2

OTHER PUBLICATIONS

D. Fallower, "Adaptive Reference Echo Cancellation", IEEE Trans. on Communications, vol. COM-30, No. 9, Sep. 1982, pp. 2083-2094.

Primary Examiner—Gene Z. Rubinson
Assistant Examiner—Randall P. Myers
Attorney, Agent, or Firm—Thomas A. Briody; William J. Streeter

[57] ABSTRACT

Arrangement for cancelling echo signals in data transmission over a two-wire transmission path. The data signals occurring in the send path are applied to an adjustable signal processing arrangement. From said data signals a synthetic echo signal (e(t)) is derived which is subtracted in a difference producer from the data signal occurring in the receive path. The residual signal (r(t)) is converted into a digital residual signal (r(j)) in an analog-to-digital converter arrangement. An interpolator which increases the sampling rate by a factor L results in the production of a digital control signal (r(i)) from the digital residual signal, for the setting arrangement. The sampling rate of the digital residual signal is M/LT Hz, wherein T is the duration of a data symbol in sec. and M and L represent integers which are relatively prime, L being greater than one.

1 Claim, 2 Drawing Figures

ARRANGEMENT FOR CANCELLING ECHO SIGNALS

BACKGROUND OF THE INVENTION

1. Field of the invention

The invention relates to an arrangement for cancelling echo signals in data transmission over a two-wire transmission path comprising means for providing a synthetic echo signal in response to the data signals transmitted to the two-wire transmission path and a digital control signal, a difference producer for forming the difference between the data signal received from the two-wire transmission path and the synthetic echo signal, for providing a residual signal, and a control signal generator comprising an analogue-to-digital converter arrangement for converting the residual signal into a digital residual signal.

Echo cancellers of this type are suitable for use in transmission equipment of data switching networks.

2. Description of the prior art

An echo canceller of the type defined in subparagraph. (1) is disclosed in U.S. Pat. No. 4,362,909, Snijders et al., and is also known from the reference 1 mentioned under the heading D. References. The sampling rate of that echo canceller, which is implemented in a digital way, is a number of times (M) the symbol rate (1/T symbols per sec.) of the data signals. Such an echo canceller is called an interpolating echo canceller.

SUMMARY OF THE INVENTION

The invention has for its object to provide an echo canceller wherein less stringent requirements are imposed on the analogue-to-digital converter arrangement of the control signal generator as regards its speed of operation, so that a cheaper construction is sufficient.

According to the invention this object is accomplished in that the control signal generator comprises an interpolator for providing a digital control signal with a sampling rate which is a factor L greater than the sampling rate of the digital residual signal, in response to the digital residual signal the sampling rate of which is M/LT hz, wherein T is the duration of a data symbol in sec. and M and L represent integers which are relatively prime, L being greater than one.

In this case the sampling period of the analogue-to-digital converter arrangement is LT/M sec. which is a factor L greater than in the prior art, so that an L-time slower converter arrangement may be used.

SHORT DESCRIPTION OF THE FIGURES

REFERENCES

1. "Digital Echo Cancellation for Baseband Data Transmission", W. A. M. Verhoeckx et al. IEEE Transactions on Acoustics, Speech and Signal Processing Vol. ASSP-27, No. 6, December 1979, pp. 768-81.

2. "A transmission module for the digital subscriber loop", B. O. Justness, Conference Records of "Communication 80", Birmingham, 1980, pp. 73-6.

DESCRIPTION OF THE EMBODIMENT

Figure 1:
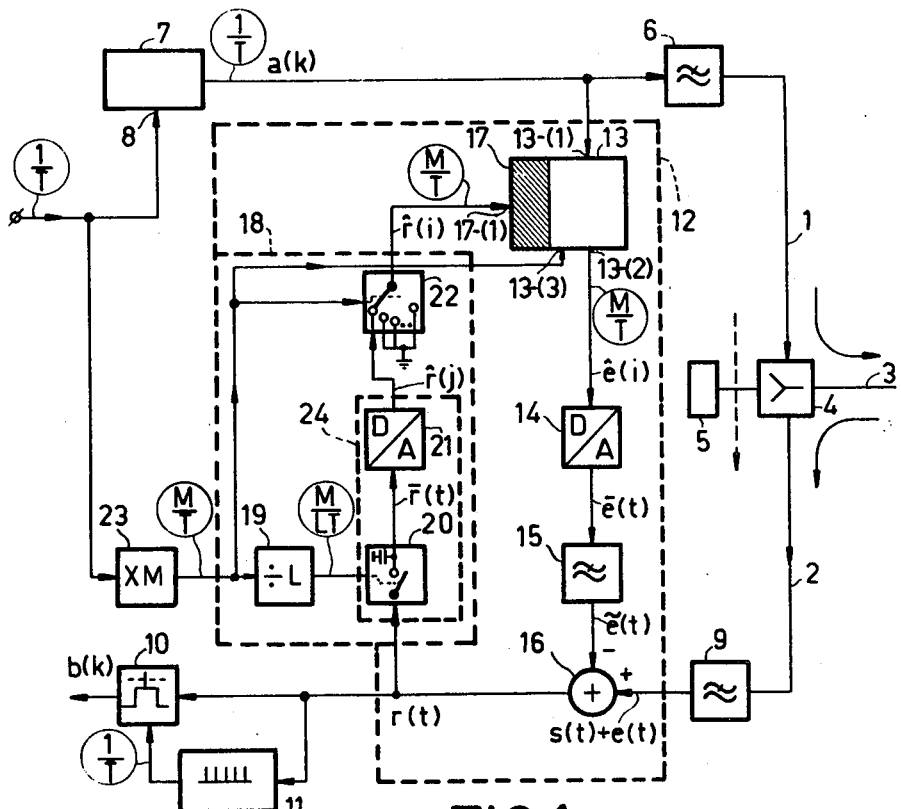
FIG. 1 shows the block schematic circuit diagram of an echo canceller in accordance with the invention.

FIG. 1 shows by means of a block schematic circuit diagram the west side of a data transmission system. The west side of the system comprises a one-way send path 1, a one-way receive path 2, as well as a two-way path 3. These several paths are interconnected by means of a hybrid coupler 4, and a balancing network 5 is connected to this coupling network in order to match the impedance of said coupler to the impedance of the two-way path 3.

In the transmission system shown the send path 1 includes a low-pass filter 6. A data source 7 producing data symbols a(k) is connected to the input of/the send path. Herein, the quantity k represents the number of the data symbol. These data symbols occur at a rate of 1/T symbols per sec., wherein T represents the duration of a data symbol in sec. For that purpose a clock signal is applied to the data source 7 by way of a clock signal input 8. The pulse repetition rate of this clock signal is 1/T pulses per sec.

In the embodiment shown the one-way receive path 2 comprises a low-pass filter 9 and a pulse regenerator 10. At the output of the low-pass filter 9 there occurs a signal s(t) which represents a filtered analogue version of a data signal consisting of the data symbols b(k) which are supplied by the data source located at the each side of the system and are transmitted by way of the two-way path 3 to the coupler 4 which applies these data symbols to the one-way receive path 2. Said data symbols also occur at a rate of 1/t symbols per sec. Therefore, the pulse regenerator 10 is controlled by a clock signal the pulse repetition rate of which is equal to 1/T pulses per sec. The data symbols b(k) which occur at the rate of 1/T symbols per sec. are obtained at the output of the pulse regenerator 10.

The east side of the system (not shown) is of a similar construction to the west side. The data source of the east side is assumed to be controlled by an independent source of clock signals or by a master clock.

The clock signal which is applied to the pulse regenerator 10 of the east side or the west side is generated by a clock extraction circuit 11 which is coupled to the receive path 2 and derives this clock signal in a conventional manner from the signals occurring in the receive path 2. If at the west side this clock signal is also applied to the clock signal input 8 of the data source 7, then the transmission system shown is said to be "homochronous". If, however, the clock signal which is applied to the clock signal input 8 of the data source 7 of the west side is generated by a separate clock signal generator then the transmission system is said to be "plesiochronous".

As in practice the impedance of the two-way path 3 is not accurately known, the balancing network 5 does not constitute a perfect termination of the coupler 4. This results in a direct leakage from send path 1 to receive path 2 by way of the coupler 4 and in signal reflections. In addition, impedance discontinuities in the two-way path 3 also result in signal reflections. Both effects have for their result that echoes of the output signal of the low-path filter 6 appear in the receive path 2. The echoes occurring at the output of the low-pass filter 9 will be indicated by e(t).

In order to eliminate the disturbing influence of these echo signals to the best possible extent the transmission system shown in FIG. 1 comprises an echo canceller 12 which includes an adjustable signal processing arrangement 13 the data signal input 13-(1) of which is connected to the one-way send path 1. Said adjustable signal processing arrangement 13 may be structured in a conventional was as an interpolating or a non-interpolating digital filter with adjustable filter coefficients, preferably as a non-recursive digital filter (reference 1), or as a memory which is addressed by the transmitted data and has adjustable contents in its memory locations (reference 2).

Hereinafter let it be assumed that the adjustable signal processing arrangement 13 is in the form of a nonrecursive interpolating digital filter having an interpolation factor M, wherein M is an integer greater than one.

Said adjustable signal processing arrangement 13 produces at discrete instants $t_0 + i\tau$ a synthetic echo signal e(i) in digital form at the output 13-(2). Herein $1/\tau$ is the sampling rate employed in the adjustable signal processing arrangement 13, i represents a number of the set 0, ±1, ±2, ... and $t_0$ is a reference instant. A digital-to-analogue converter 14 converts the synthetic echo signal ê(i) into a time continuous and amplitude discrete signal ẽ(t) which in its turn is converted into an analogue signal $\bar{e}(t)$ by an analogue low-pass filter 15. This analogue synthetic echo signal $\bar{e}(t)$ is applied to a difference producer 16 and subtracted from the signals in the receive path 2. A residual signal $r(t) = s(t) - \bar{e}(t)$ which comprises a residual echo signal $e(t) - \bar{e}(t)$ now appears at the output of the difference producer 16. This residual signal is applied to the pulse regenerator 10.

For adjusting the adjustable signal processing arrangement 13 a setting arrangement 17 is connected thereto, the control signal input 17-(1) of which is supplied with a control signal r(i) in digital form. This control signal r(i) is supplied by a control signal generator 18, which has a construction in accordance with the invention and is connected to the output of the difference producer 16 and to the output of a frequency multiplier 23. By means of the frequency multiplier 23 sampling pulses having a sampling rate $1/\tau$ are derived from the clock pulses which are applied to the clock signal input 8 of the data source 7. This multiplier 23 has a multiplication factor M, so that the sampling pulses occur at a rate $1/\tau = M/T$ Hz.

The control signal generator 18 comprises an analogue-to-digital converter arrangement 24, comprising a sample-and-hold arrangement 20 and an analogue-to-digital converter 21, and an interpolator 22. The sample-and-hold arrangement 20 converts the residual signal r(t) into a time continuous and amplitude-discrete residual signal r̄(t). The sample- and-hold arrangement 20 is controlled by sampling pulses which are derived by means of a frequency divider 19 from the sampling pulses at the output of frequency multiplier 23. The frequency divider 19 has a division factor L so that the sampling pulses at the output of frequency divider 19 occur at a rate of M/LT Hz.

Let it be assumed that L is an integer greater than one. The signal r̄(t) at the output of the sample- and-hold arrangement 20 is converted at discrete instants $t_0 + jL$ into numbers (f̂(J) in base-2 code in the analogue-to-digital converter 21. Herein j represents a number of the set 0, ±1, ±2, .... The numbers f̂(j) are applied to the interpolator 22 which is of such a construction that (L-1) numbers having the value zero are inserted between two consecutive numbers f̂(j). The interpolator 22 is controlled by the sampling pulses supplied by the frequency multiplier 23 and produces a digital output signal f̂(i) with a sampling rate of M/T Hz which is applied as a control signal to the setting arrangement 17.

Figure 2:
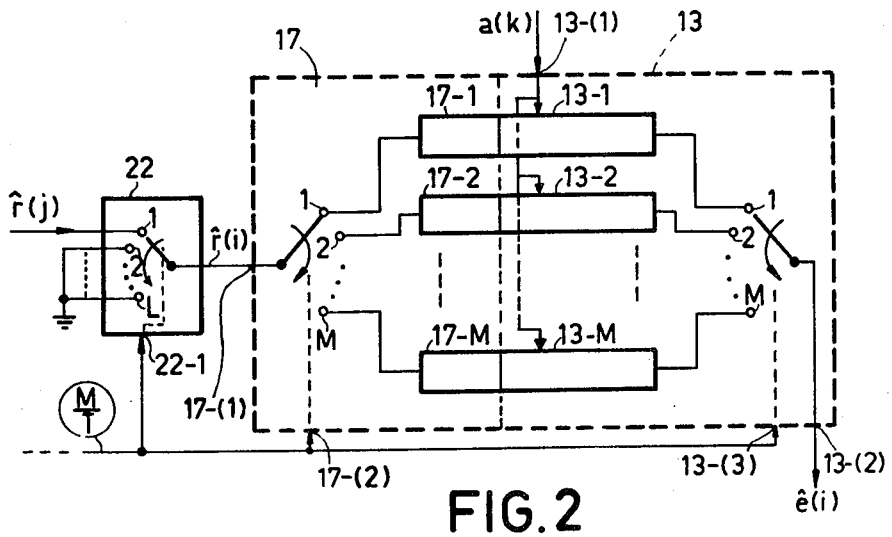
FIG. 2 shows the basic circuit diagram of a prior art adjustable interpolating signal processing arrangement together with the interpolator in accordance with the invention, for use in the echo canceller shown in FIG. 1.

The adjustable signal processing arrangement which in this example is in the form of an adjustable, non-recursive interpolating digital filter may, as demonstrated in reference 1 be assumed to be constituted by M adjustable, non-interpolating signal processing arrangements 13-1, 13-2, ... 13-M, which each perform successively in cyclic sequence a processing operation on the input signal a(k). Also the setting arrangement 17 may be assumed to be constituted by M non-interpolating setting arrangements 17-1, 17-2, ... 17-M which successively in cyclic sequence determine a new setting for the adjustable signal processing arrangements 13-1, 13-2, ... 13-M. This is shown schematically in FIG. 2. This Figure also shows the interpolator 22. The interpolator 22, the adjustable signal processing arrangement 13 and the setting arrangement 17 are all controlled by sampling pulses supplied by the frequency multiplier 23 and applied to the respective clock signal inputs 22-1, 17-(2) and 13-(3).

If the division factor L is chosen to be equal to 1, each of the M non-interpolating signal processing arrangements 13-1, 13-2, ... 13-M will be set in cyclic sequence by the digital signal f̂(j). The signal processing arrangement 13 will then act as an adjustable interpolating filter having an interpolation factor M. This case corresponds to the prior art, the frequency divider 19 and the interpolator 22 not being present. For the event that L is greater than one and is a factor of M only the non-interpolating signal processing arrangement 13-1, 13-(L+1), 13-(2L+1), ... 13-M will be set in cyclic sequence by the digital signal f̂(j) because of the fact that (L-1) numbers having the value zero are inserted between two consecutive numbers f̂(j). The combination of the interpolator 22 and the adjustable signal processing arrangement 13 will then not act as an adjustable interpolating filter having an interpolation factor M but having an interpolation factor of not more than M/L.

Therefore the division factor L is chosen equal to an integer which is greater than one and which is relatively prime with respect to the interpolation factor M. With this choice of the division factor L the combination of the interpolator 22 and the adjustable signal processing arrangement 13 acts as an adjustable interpolating digital filter having an interpolation factor M. This will be explained in an illustrative example wherein M=4 and L=3.

In the first considered cycle of T sec. the adjustable, non-interpolating signal processing arrangements 13-1 and 13-4, for example, will be set by the digital signal f̂(j). In the second cycle the adjustable signal processing arrangement 13-3 and in the third cycle the adjustable signal processing arrangement 13-2 will be see. After L cycles of T sec. all M non-interpolating signal processing arrangements 13-1, 13-2 ... 13-M will have been adjusted once. The setting period for one signal processing arrangement is LT/M sec.

As the sample- and-hold arrangement 20 is controlled by sampling pulses at a rate of M/LT Hz the time available for converting a signal sample f̂(j) into a number f̂(j) in base-2-code is equal to LT/M sec. Then the analogue-to-digital converter 21 may be a factor L slower compared to the prior art wherein only T/M sec is available for each converting operation.

In cases in which the use of a non-interpolating signal processing arrangement 13 (M=1) is sufficient the invention may also be used. Also in this case, when L is chose to be greater than one, the use of a digital-to-analogue converter 21 which can operate a factor L slower will be sufficient.

The invention is not limited to a structure of the signal processing arrangement 13 as described in reference 1. For the signal processing arrangement 13 the structure described in reference 2 may alternatively be opted for. Herein use is made of a random access memory which at each sampling instant produces a synthetic echo signal for cancelling the echo signals occurring in the receive path 2. Said sampling instants may occur with the period T or T/M, wherein M is greater than one.

What is claimed is:

1. In an arrangement for cancelling echo signals in a data transmission system having means for transmitting digital data signals to and receiving digital data signals from a transmission path, said arrangement comprising means for providing a synthetic echo signal in response to the data signals transmitted to the transmission path and a digital control signal, a difference producer for forming the difference between the data signal received from the transmission path and the synthetic echo signals, for providing a residual signal, and a control signal generator comprising an analog-to-digital converter arrangement for converting the residual signal into a digital residual signal; the improvement wherein the control signal generator further comprises means sampling said digital residual signal at a rate of M/LT Hz, and an interpolator for providing said digital control signal with a sampling rate which is L times the sampling rate for the digital residual signal, wherein T is the duration of a data symbol in sec. and M and L represent prime integers, L being greater than one.

* * * * *